March 5, 1957  E. MAURER  2,783,683
DEVICE FOR PROVIDING THE DRIVER OF AN AUTOMOBILE WITH A CLEAR
VIEW IN BOTH DIRECTIONS OF A STREET HE IS ABOUT TO ENTER
Filed Dec. 18, 1953  2 Sheets-Sheet 1

INVENTOR
EMILE MAURER

BY Louis C. Smith
ATTORNEY

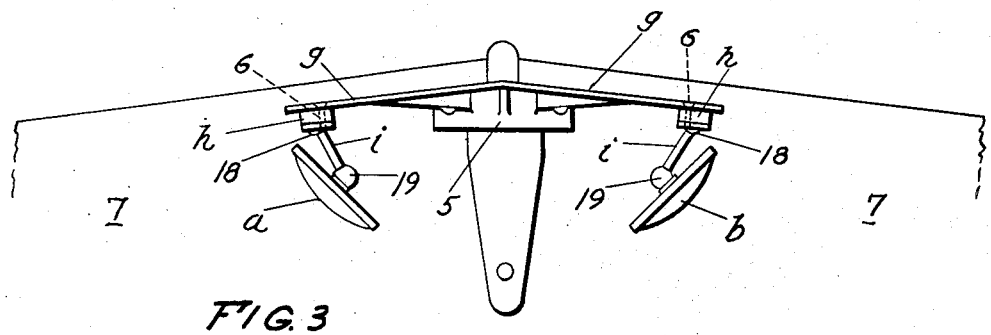
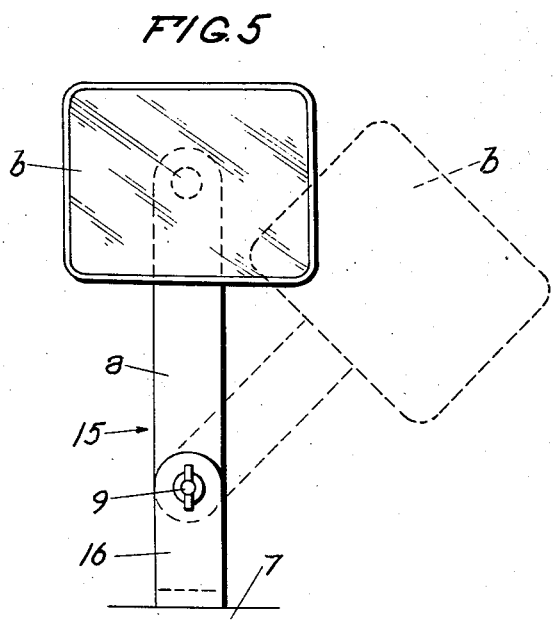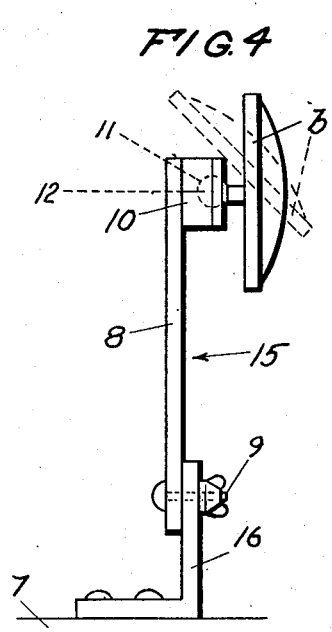

United States Patent Office 2,783,683
Patented Mar. 5, 1957

2,783,683

DEVICE FOR PROVIDING THE DRIVER OF AN AUTOMOBILE WITH A CLEAR VIEW IN BOTH DIRECTIONS OF A STREET HE IS ABOUT TO ENTER

Emile Maurer, Mulhouse, France

Application December 18, 1953, Serial No. 399,100

1 Claim. (Cl. 88—86)

This invention relates to a novel device by which the driver of an automobile which is approaching an intersection can obtain a clear view in both directions of the street he is about to enter before the automobile actually enters such street.

The device is especially useful when the intersection presents so-called "blind corners" due to the presence of buildings, shrubbery, or the like, which obscures the view at the corners of the intersection.

It has heretofore been proposed to provide the driver of an automobile about to enter an intersection with such clear view of the street he is to enter by placing mirrors at the corners of the intersection. However, to place such mirrors at all the intersections of a large city involves a large expense and such mirrors are very apt to be damaged or broken by vandals.

It is an object of the present invention to provide the driver of an automobile with the desired clear view in both directions of the street he is about to enter at an intersection by placing two mirrors on the front end of the automobile, one mirror being mounted so as to reflect to the driver a clear view of the intersecting street at the right and the other mirror being mounted so as to provide the driver with a clear view of such intersecting street at the left. Hence with the present invention the driver can obtain the desired clear view of the traffic conditions on the street he is about to enter from both directions before the automobile actually enters said street. The driver therefore is in a position to enter the street when traffic conditions thereon will permit him to do so without any hazard.

In the drawings:

Fig. 3 is a plan view of the device shown in Fig. 2;

Fig. 4 is a fragmentary view illustrating one way in which the mirrors may be mounted on the front of the automobile; and, Fig. 5 is a front view of Fig. 4.

Fig. 1 shows diagrammatically two intersecting streets indicated at A and B, the intersection presenting blind corners f due to the presence of buildings placed close to the streets. In said Fig. 1 3 indicates an automobile on street A which is about to enter street B, c being the driver of such automobile.

In accordance with my invention two mirrors a and b are mounted on the front end of the automobile 3, the mirror a being so placed that the driver c can obtain a reflected view of the traffic conditions on street B at the left as shown by the broken lines k. The mirror b is so placed that it reflects to the driver c a view of the street B at the right and therefore this mirror b gives the driver c a clear view of traffic conditions on street B at the right.

Figure 1:
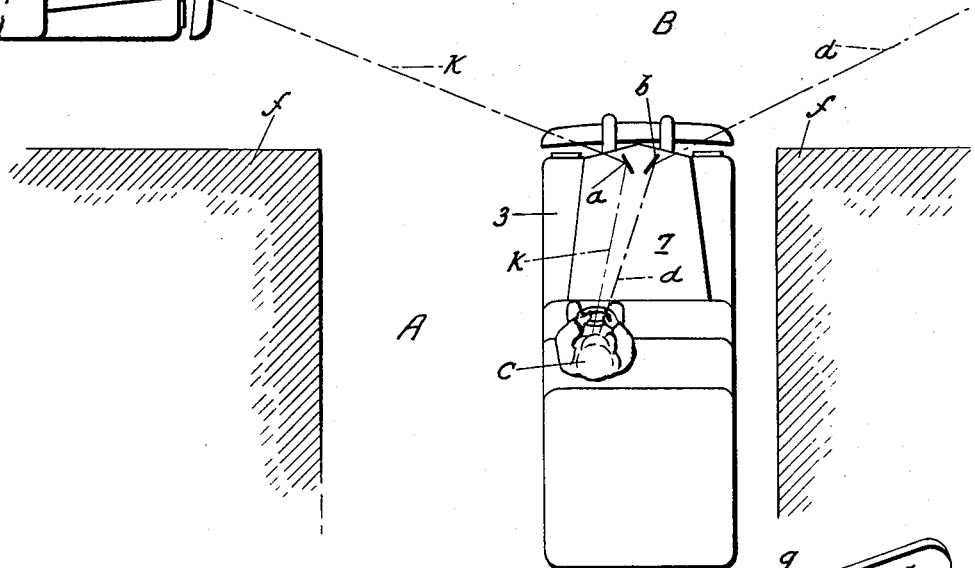
Fig. 1 is a more or less diagrammatic view illustrating an automobile equipped with a pair of mirrors about to enter a street from a side street, said figure illustrating the manner in which the driver of the car can obtain the desired view of traffic conditions on the street he is about to enter.

Since the mirrors are located on the front of the automobile they pick up the view in both directions on the street B while the automobile 3 is still in street A and before it actually enters the intersection. If the corners of the intersection are blind corners, as shown by the corners f in Fig. 1, then the driver c of automobile 3 will get his clear view of traffic conditions on the street B before the automobile 3 has proceeded into street B sufficiently to enable the driver to have a direct view of said street B. Hence the driver c is in a position to choose a time for entering street B when the traffic conditions on said street permit him to do so without any hazard.

The mirrors a and b can be mounted on the automobile 3 in any suitable way. In Fig. 4 one of the mirrors is shown as mounted on an articulated mirror support 15 which comprises a lower section 16 that is secured in any suitable way to the hood 7 of the automobile, and an upper section 8 which is pivoted to the lower section 16 at 9. The upper section 8 carries a head 10 provided with a socket 11 in which is received a ball-shaped extension 12 on the back of the mirror b. The ball-shaped extension 12 and the socket receiving the same permit the mirror b to be tilted in any direction so that it can be readily adjusted into the correct angular position to provide the driver c with the desired view of the traffic conditions on street B. The sectional mirror support 15 also provides for further adjustment of the mirror.

Figure 2:
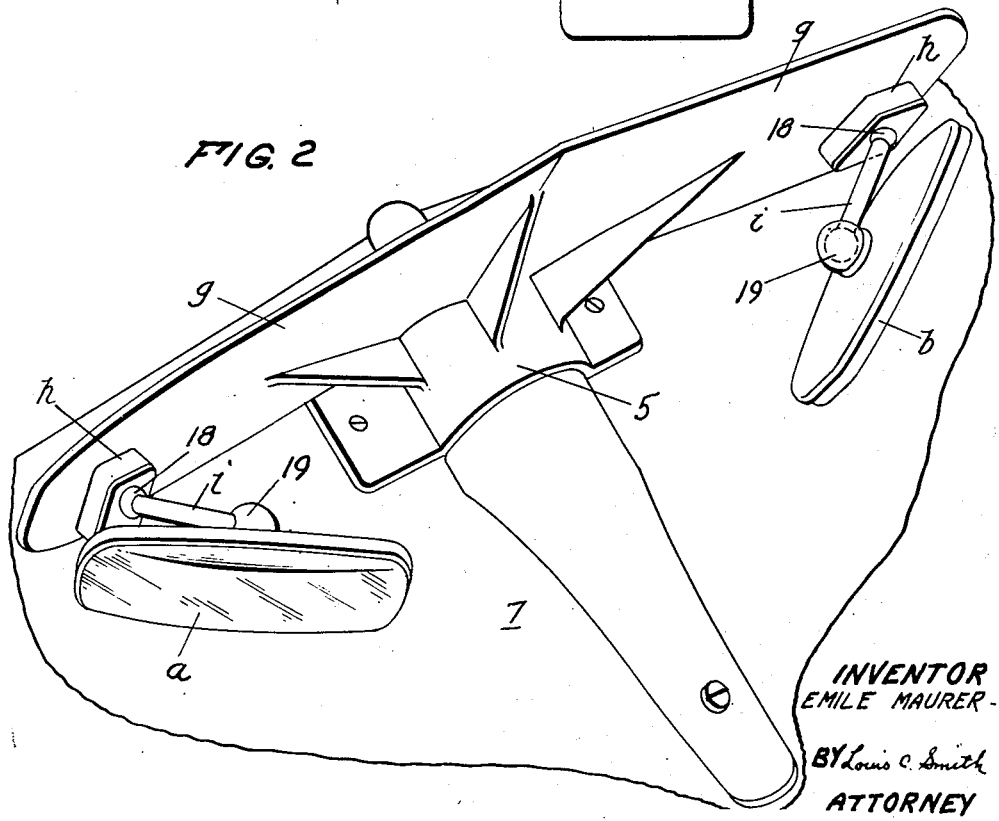
Fig. 2 is a fragmentary perspective view showing one way of mounting the mirrors on the front of an automobile.

Another way of mounting the mirrors on the automobile is shown in Figs. 2 and 3 wherein such mirrors are mounted on an ornament or deflector with which the automobile is provided. In said Figs. 2 and 3 g indicates a deflector which is designed to deflect from the windshield insects, mud, snow, etc., which the automobile may pick up during its rapid movement. This deflector g is shown as carried by a supporting bracket 5 which is secured in some suitable way on the hood 7 of the automobile at the front end thereof. The mirrors a and b are each secured to the deflector by means of attaching brackets h which are secured to the deflector near each vertical edge by means of suitable screws 6. Each bracket h has pivotally secured thereto an arm i as shown at 18 and each arm has one of the mirrors a or b mounted thereon, the connection between each mirror and its arm preferably being a ball and socket connection such as is commonly used in mounting rear view mirrors, such ball and socket connection providing for tilting each mirror in any direction, thereby to adjust it into a proper position to give the driver c the desired reflection of the street B.

While any suitable pivotal connection 18 may be employed for pivotally connecting the arm i to the bracket h, yet I prefer to provide a ball and socket connection such as is used for mounting the mirror on the arm because such ball and socket connection provides for swinging the arm i either upwardly or downwardly or laterally to and from the deflector g thereby providing an universal pivotal connection which facilitates proper orientation of the mirror.

The mirrors a and b may be plain mirrors or convex mirrors as desired. The deflector g is frequently made of some translucent material, but regardless of the material from which it is made it may be utilized to support the mirrors a and b.

I claim:

The combination with an automobile having a transversely extending deflector mounted at its front end, of an attaching bracket secured to the rear face of said deflector at each end thereof, each bracket having a socket bearing, a mirror supporting arm having a ball at each end, the ball at one end being mounted in the socket of the corresponding attaching bracket, a mirror element for each supporting arm, each mirror element having a reflecting face and a socket portion on the back face thereof in which the other ball of the corresponding mirror supporting arm is mounted, whereby the arm carrying the mirror element may be swung in either a vertical direction or a horizontal direction about its point of attachment with the attaching bracket, and each mirror element may be turned about either a horizontal axis or a vertical axis relative to the supporting arm, each mirror element being thus adjustable to reflect to the driver of the automobile as he is about to enter an intersection a clear view in both directions of the street he is about to enter.

References Cited in the file of this patent

UNITED STATES PATENTS

| | | |
|---|---|---|
| 1,135,446 | Fellowes | Apr. 13, 1915 |
| 1,562,335 | Jones | Nov. 17, 1925 |

FOREIGN PATENTS

| | | |
|---|---|---|
| 142,041 | Switzerland | Nov. 17, 1930 |
| 98,218 | Sweden | Dec. 28, 1939 |